Sept. 19, 1972   R. M. NETI ET AL   3,692,485
NITRIC OXIDE DETECTION
Filed July 2, 1971

INVENTOR.
RADHAKRISHNA M. NETI
COLIN C. BING
BY William F. McDonald 3,692,485
NITRIC OXIDE DETECTION
Radhakrishna M. Neti, Brea, and Colin C. Bing, Placentia, Calif., assignors to Beckman Instruments, Inc.
Filed July 2, 1971, Ser. No. 159,266
Int. Cl. G01n 21/26
U.S. Cl. 23—232 R                    10 Claims

ABSTRACT OF THE DISCLOSURE

A method of measuring the nitric oxide concentration in a gas stream is disclosed. The gas stream is mixed with ozone at the entrance to a reaction chamber so that the mixture enters the reaction chamber as a point source. The intensity of the light emitted as a result of the chemiluminescent reaction between the ozone and the nitric oxide at the point source is measured. The intensity of the emitted light is a function of the nitric oxide concentration in the gas stream, whereby the nitric oxide concentration is measured. Apparatus for measuring the nitric oxide concentration in a gas stream is also disclosed. The apparatus includes a walled vessel having a reaction chamber and having two inlet passages and an exhaust passage in the wall thereof. The two inlet passages converge together to a common inlet opening into the chamber. A light window is positioned in the wall of the chamber opposite and in close proximity to the common inlet so that the light emitted by a chemiluminescent reaction between the gases and the two inlet passages at the common inlet can be measured as a point source. Means are associated with the light window for measuring the light emitted by the chemiluminescent reaction.

BACKGROUND OF THE INVENTION

The instant invention relates to the detection of nitric oxide. It particularly relates to the measurement of the nitric oxide concentration in a gas stream such as polluted air or automobile exhausts. The nitric oxide measured may be the pollutant itself or if nitrogen dioxide is the pollutant, it may be converted to nitric oxide for measurement.

Nitric oxide as well as nitrogen dioxide is formed as a by-product in the processes of combustion. Some of the sources of the combustion gases are power plants and automobiles, electric power generating station, and home heating units. All these, along with others, produce nitrogen oxides of varying concentrations. Other air polluting species are also generated, for example through the emission of airborne reactive hydrocarbons which react with sunlight to produce other pollutants.

It has become necessary to measure the levels from these various sources in order to attempt to minimize the health hazards of these oxides of nitrogen. Nitrogen dioxide may be measured after its conversion to nitric oxide. The nitric oxide concentration itself also has to be determined. In either case, several techniques are currently being practiced to determine the concentration of the nitric oxide.

Nitric oxide absorbs light either in the far ultraviolet or in the infrared regions of the electromagnetic spectrum. Spectrophotometers have therefore been built to determine the nitric oxide levels. However, the usefulness of these devices decreases if the detection limits are a few parts per million, as they frequently are in polluted air.

A second approach has been to oxidize the usually non-reactive nitric oxide to the reactive nitrogen dioxide by either gas phase oxidation or liquid phase oxidation and measure the nitrogen dioxide either coulometrically or colorimetrically. These methods also lack wide dynamic range and are restricted in utility to concentrations of a few parts per million.

Another approach has been to study some of the gas phase reactions of nitric oxide. One of these involves the reaction of nitric oxide with ozone upon mixing nitric oxide and ozone. Light is emitted as a by-product of this chemical reaction. The amount of light so emitted can be used as a measure of the nitric oxide. According to the prior art, such devices can be used if this reaction is observed under vacuum. Thus the working limit range of devices of this type is usually about $10^{-3}$ millimeters to 2 millimeters mercury pressure as the lower and upper limits. The reaction chambers must either be of stainless steel or heavy glass flasks. These are usually coated with white barium sulfate and/or magnesium oxide to improve the light collection efficiency. The emitted light is detected by a suitable photomultiplier tube together with a current measuring device. A typical device of this type is described in U.S. Pat. 3,528,779 to Fontijn which issued Sept. 15, 1970.

The chemiluminescent technique possesses the advantage of having a wide dynamic range and is useful for monitoring from the ambient levels, i.e. parts per billion, to the source levels, i.e. parts per million. The disadvantages of the known chemiluminescent techniques are that they require a very high vacuum, careful and precise control of the working pressure, and efficient light collection and collimating systems.

SUMMARY OF THE INVENTION

It is an object of the instant invention to provide a method of and apparatus for the measurement of the nitric oxide concentration in a gas stream which, although is uses the chemiluminescent technique, has none of the disadvantages of the prior art systems. It is an advantage of the instant invention that a very high vacuum is not necessary. It is a further advantage of the instant invention that careful and precise control of the working pressure is not necessary. Yet another advantage of the instant invention is that the highly efficient light collection and collimating systems of the known devices are not necessary. Much simpler light collection and collimating systems can be utilized.

The method of measuring the nitric oxide concentration in a gas stream with ozone at the entrance to a reaction chamber so that the mixture enters the reaction chamber as a point source. The intensity of the light emitted as a result of the chemiluminescent reaction between the ozone and the nitric oxide at the point source is measured. This light intensity is a function of the nitric oxide concentration in the gas stream, whereby the nitric oxide concentration is measured.

The apparatus for measuring the nitric oxide concentration in a gas stream includes a walled vessel having a reaction chamber and having two inlet passages and an exhaust passage in the wall thereof. The two inlet passages converge together to a common inlet opening into the chamber. A light window is positioned in the wall of the chamber opposite and in close proximity to the common inlet so that the light emitted by a chemiluminescent reaction between the gases in the two inlet passages at the common inlet can be measured as a point source. Means are associated with the light window for measuring the light emitted by the chemiluminescent reaction.

BRIEF DESCRIPTION OF THE DRAWING

The same reference numerals have been applied to corresponding parts in both figures of the drawings.

DETAILED DESCRIPTION

Figure 1:
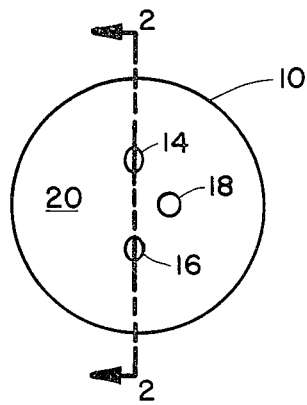
FIG. 1 is an elevational view of the walled vessel having a reaction chamber according to the instant invention.
Figure 2:
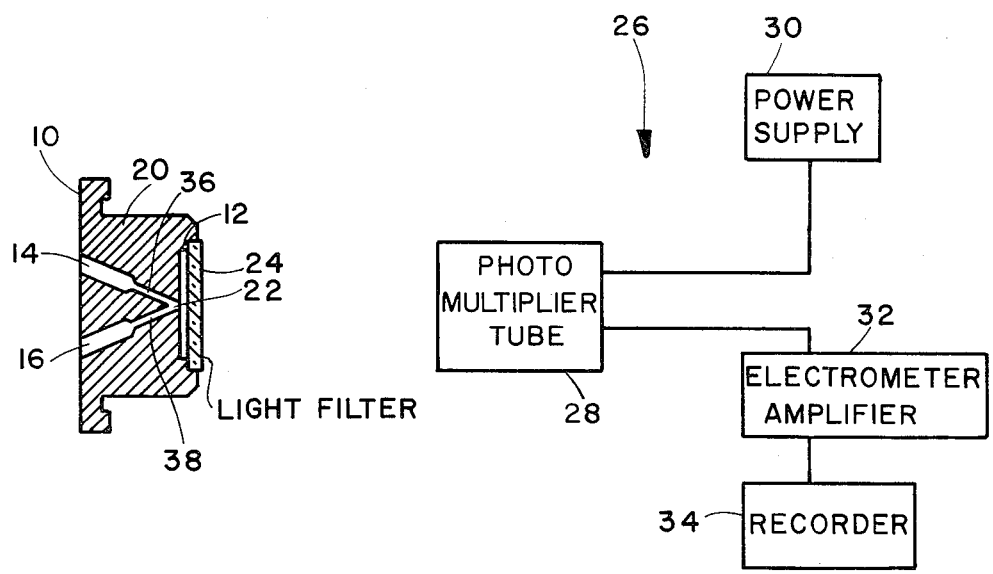
FIG. 2 is a side elevational view with parts removed for purposes of clarity taken along line 2—2 of FIG. 1 and with suitable measuring means shown in block diagram form.

FIG. 1 is an end view of a walled vessel 10 having, as can be seen in FIG. 2, a reaction chamber 12 therein. The vessel 10 has two inlet passages 14, 16 and an exhaust passage 18 in the wall 20 thereof. As can be seen in FIG. 2, the two inlet passages 14, 16, converge together to a common inlet opening 22 into chamber 12.

Referring again to FIG. 2, a light window, shown as light filter 24 is positioned in wall 20 of vessel 10 surrounding chamber 12 opposite and in closed proximity to common inlet 22 so that light emitted by a chemiluminescent reaction between the gases in the two inlet passages 14, 16, at common inlet 22 can be measured as a point source. Means indicated generally at 26 are associated with the light window or filter 24 for measuring the light emitted by the chemiluminescent reaction.

The measuring means 26 desirably include a photoelectric detector such as photomultiplier tube 28. A power supply 30 such as a battery pack or a connection to generated electrical current is connected to photoelectric detector or photomultiplier tube 28. A suitable electrometer amplifier 32 is connected to photomultiplier tube 28 for amplifying an electrical signal produced by photoelectric detector or photomultiplier tube 28 as a result of a chemiluminescent reaction. A suitable recorder 34 is connected to amplifier 32 for recording the amplified signal.

Desirably the inlet passages 14 and 16 have maximum diameters in the reduced portions 36, 38, of about 0.050 inch. When this is the case, the maximum distance between light window or filter 24 and common inlet 22 should be about 0.06 inch. When the reduced portions 36, 38 have diameters of about 0.047 inch, the distance between light window or filter 24 and common inlet 22 should be about 0.03 inch. This permits the reaction to occur at the common inlet opening 22 as a point source and for it to be measured as a point source at that position. Obviously, if different dimensions are used for the reduced portions 36, 38 of the inlet passages 14, 16, then a different maximum distance between the light window or filter 24 and common inlet opening 22 must also be used. This can be determined by experimentation.

A series of tests were conducted to determine the efficacy of the instant invention wherein no provision is made for high vacuum and the reactions are permitted to occur at normal pressures. The results of these experiments are shown in Table I below.

In all cases a mixture of nitrogen and nitrogen dioxide was passed through an ultraviolet reactor where the nitric oxide to be measured was formed. The faster the flow was past the ultraviolet reactor, the smaller the conversion and hence the lower the concentration of nitric oxide in the gas stream. In runs A, B, and C, the instant invention was practiced. Reduced portions 36, 38 had diameters of about 0.047 inch and the distance between light window or filter 24 and common inlet 22 was about 0.03 inch. In runs D, E, and F, reduced portions 36, 38 had diameters of about 0.047 inch but common inlet 22 was set back in a cylindrical passage having a diameter of about 0.060 inch, about an additional 0.20 inch so that the total distance between light window or filter 24 and common inlet 22 was about 0.23 inch. As can be seen, the signal fell off sharply.

TABLE I

| Run | Flow rate gas mixture, cc./min. | Signal after correction for background noise, amperes | Photomultiplier tube voltage, volts |
|---|---|---|---|
| A | 15 | $30 \times 10^{-11}$ | 1,500 |
| B | 30 | $19 \times 10^{-11}$ | 1,500 |
| C | 60 | $11 \times 10^{-11}$ | 1,500 |
| D | 20 | $11 \times 10^{-11}$ | 1,400 |
| E | 100 | $4 \times 10^{-11}$ | 1,400 |
| F | 15 | $18 \times 10^{-11}$ | 1,500 |

The results of runs A and F can be directly compared. The falling off of the signal strength is striking. All runs were at about atmospheric pressure.

It can readily be seen that according to the instant invention the gas stream is mixed with ozone at the entrance or common inlet opening 22 to the reaction chamber 12 so that the mixture of gases enters reaction chamber 12 as a point source. The intensity of the light emitted as a result of the chemiluminescent reaction between the ozone and the nitric oxide at the point source is measured. This is possible through the location of the photodetector or photomultiplier 28 which is positioned behind light window or filter 24 which is positioned in wall 20 of the chamber 12 opposite and in close proximity to common inlet 22. This arrangement permits the maximum light collection efficiency.

The results shown in Table I are contrary to the findings of earlier investigations which indicated that at the excessive pressure, i.e. approximately atmospheric pressure, at which the reaction takes place, insufficient light would have been admitted for any useful measurement. The light levels observed in Table I above, when the instant invention is practiced, eliminate the need for rigorous control of vacuum and for extremely low working pressures. The reaction was investigated with gas pressures of less than 100 millimeters to 750 millimeters. In this range, the emitted light level was a function only of the concentration or flow rate of the gases mixed and not of the working pressures. Thus an extremely light weight portable instrument can be provided since there is no necessity for the cumbersome and heavy vacuum maintenance equipment. The ozone may be generated simply by the action of ultraviolet light on ambient oxygen. This method of making ozone does not set a lower limit of detection levels as do some other forms of ozone generation such as various gas discharge techniques.

It has been found that when the instant invention is practiced, nitric oxide can be determined from about two parts per billion to about several parts, i.e. thousands per million. In the tests shown in Table I above, EMI 9558AQ and RCA C31000B red sensitive photomultiplier tubes were used. However, any other photosensitive devices can be used without in any way changing the practice of the instant invention.

While there have been shown and described hereinabove possible embodiments of this invention, it is to be understood the invention is not limited thereto and that various changes, alterations, and modifications can be made thereto without departing from the spirit and scope thereof as defined in the claims wherein what is claimed is:

1. The method of measuring the nitric oxide concentration in a gas stream which comprises:
   (a) mixing the gas stream with ozone at the entrance to a reaction chamber so that the mixture enters the reaction chamber as a point source; and
   (b) measuring the intensity of the light emitted as a result of the chemiluminescent reaction between the ozone and the nitric oxide at the point source, which is a function of the nitric oxide concentration in the gas stream, whereby the nitric oxide concentration is measured.

2. The method of claim 1 wherein the pressure in the reaction chamber is about atmospheric.

3. The method of claim 1 wherein the intensity of the light is photoelectrically detected.

4. The method of claim 3 including the additional step of passing the electrical signal produced as a result of the photoelectric detection through an electrometer amplifier to a recorder.

5. Apparatus for measuring the nitric oxide concentration in a gas stream which comprises:
 (a) a walled vessel having a reaction chamber and having two inlet passages and an exhaust passage in the wall thereof, the two inlet passages converging together to a common inlet opening into the chamber;
 (b) a light window positioned in the wall of the chamber opposite and in close proximity to the common inlet so that the light emitted by a chemiluminescent reaction between the gases in the two inlet passages at the common inlet can be measured as a point source; and
 (c) means associated with the light window for measuring the light emitted by the chemiluminescent reaction.

6. The apparatus of claim 5 wherein the measuring means comprises a photoelectric detector.

7. The apparatus of claim 6 wherein the photoelectric detector is a photomultiplier tube.

8. The apparatus of claim 5 wherein the measuring means includes the following additional elements:
 (a) a power supply connected to the photoelectric detector;
 (b) an electrometer amplifier connected to the detector for amplifying an electrical signal produced by the photoelectric detector as a result of the chemiluminescent reaction; and
 (c) a recorder connected to the amplifier for recording the amplified signal.

9. The apparatus of claim 5 wherein the inlet passages have maximum diameters of about 0.050 inch and the maximum distance between the light window and the common inlet is about 0.06 inch.

10. The apparatus of claim 5 wherein the inlet passages have diameters of about 0.047 inch and the distance between the light window and the common inlet is about 0.03 inch.

References Cited

UNITED STATES PATENTS

| | | | |
|---|---|---|---|
| 3,399,974 | 9/1968 | Spencer et al. | 23—254 E |
| 3,528,779 | 9/1970 | Fontijn | 23—254 E X |
| 3,647,387 | 3/1972 | Benson et al. | 23—232 R |

MORRIS O. WOLK, Primary Examiner

R. M. REESE, Assistant Examiner

U.S. Cl. X.R.

23—232 E, 254 E